(12) United States Patent
Klouda et al.

(10) Patent No.: US 12,399,666 B1
(45) Date of Patent: Aug. 26, 2025

(54) MULTILAYER SYSTEM FOR CREATING A TRANSITIONING SCENE

(71) Applicant: DISNEY ENTERPRISES, INC., Burbank, CA (US)

(72) Inventors: Jessica Anne Klouda, Winter Garden, FL (US); Daniel Mark Joseph, Windermere, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 18/661,789

(22) Filed: May 13, 2024

(51) Int. Cl.
  *G06F 3/14* (2006.01)
  *G09G 3/34* (2006.01)

(52) U.S. Cl.
  CPC .............. *G06F 3/14* (2013.01); *G09G 3/3406* (2013.01); *G09G 2300/023* (2013.01); *G09G 2320/0626* (2013.01)

(58) Field of Classification Search
  CPC ........... G09G 3/3406; G09G 2330/022; G09G 3/2003
  See application file for complete search history.

(56) References Cited

U.S. PATENT DOCUMENTS

| | | | |
|---|---|---|---|
| 2015/0348468 A1* | 12/2015 | Chen | G09G 3/3413 345/207 |
| 2016/0162242 A1* | 6/2016 | Xiong | G06F 3/147 345/5 |
| 2017/0301288 A1* | 10/2017 | Perdices-Gonzalez | G09G 3/3208 |
| 2017/0309215 A1* | 10/2017 | Perdices-Gonzalez | G09G 3/36 |
| 2018/0181287 A1* | 6/2018 | O'Brien | G06F 3/0482 |

* cited by examiner

*Primary Examiner* — Van N Chow
(74) *Attorney, Agent, or Firm* — Dorsey & Whitney LLP

(57) ABSTRACT

A system may include a first portion providing a first scene (e.g., a day scene) of an image, a second portion providing a second scene (e.g., a night scene) of the image, and means (e.g., a backlight) for transitioning the system from the first scene to the second scene. The first portion may be a first mode stack, and the second portion may be a second mode stack. The second mode stack may include a greater number of layers compared to the first mode stack. A filter may be positioned between the stacks. The first mode may be visible based on light directed onto the first mode stack. Selective activation of the backlight may transition the system from the first mode to the second mode, such as shifting or augmenting the image from the first mode to the second mode. Additional systems and associated methods are also disclosed.

20 Claims, 4 Drawing Sheets

MULTILAYER SYSTEM FOR CREATING A TRANSITIONING SCENE

FIELD

The present application relates to multilayer systems and methods for creating a transitioning scene.

BACKGROUND

Printed methods of transitioning a scene between different lighting schemes have been used to create artistic effects. In some instances, the scenes may include two layers, one layer for each respective mode or image. Existing methods, however, do not afford much control and nuance in the images that are created.

Therefore a need exists for systems and methods of creating a scene that transitions to different appearances or effects (e.g., different lighting effects) in a way that is easily maintainable, simply controlled, and able to be manufactured in a repeatable way.

BRIEF SUMMARY

In one example, a system configured to selectively display a first scene or a second scene of an image includes a first portion providing the first scene of the image and a second portion providing the second scene of the image. The system may include a backlight, the second portion positioned between the backlight and the first portion. Selective activation of the backlight may transition the system from the first scene to the second scene.

Optionally, the first scene is visible based on light directed onto the first portion.

Optionally, the system includes a filter layer positioned between the first portion and the second portion. The first portion, the second portion, and the filter layer may be stacked on top of one another in alignment. The filter layer may include a mask that covers a first portion of the image. The first portion may include a foreground of the image.

Optionally, the second portion includes a plurality of film layers with the second scene. The first portion may include a single film layer with the first scene.

Optionally, the first portion includes a first mode stack providing a first scene of the image. The second portion may include a second mode stack providing a second scene of the image.

Optionally, the backlight is edge lit.

In another example, a system switchable between a first mode displaying a first scene of an image, and a second mode displaying a second scene of the image, includes a first mode stack providing the first scene, a second mode stack providing the second scene, and a backlight. The second mode stack may be positioned between the backlight and the first mode stack. The first scene may be visible based on light directed onto the first mode stack. Selective activation of the backlight may transition the system from the first scene to the second scene.

Optionally, the system includes a filter layer positioned between the first mode stack and the second mode stack. The filter layer may include a neutral density filter.

Optionally, the first mode stack includes a first number of film layers. The second mode stack may include a second number of film layers. The second number may be greater than the first number. Each film layer of the first mode stack and the second mode stack may include image elements that align when stacked on top of one another. The first scene or the second scene may be printed on each film layer.

In another example, a system configured to display a visible image includes a first mode providing a first scene for the image, a second mode providing a second scene for the image, and a backlight. The system may be configured to transition between the first mode and the second mode based on activation of the backlight.

Optionally, the system includes a second mode stack providing the second scene. The backlight may be configured to selectively illuminate the second mode stack. Selective illumination of the second mode stack may shift the image from the first scene to the second scene. The system may include a first mode stack providing the first scene. Each of the first mode stack and the second mode stack may include one or more film layers. The second mode stack may include a greater number of film layers compared to the first mode stack. The system may include a neutral density (ND) filter positioned between the second mode stack and the first mode stack. The ND filter may define a mask cut to cover select portions of the image.

Optionally, the system includes a front light configured to direct light onto a front surface.

In addition to the exemplary aspects and embodiments described above, further aspects and embodiments will become apparent by reference to the drawings and by study of the following description.

DETAILED DESCRIPTION

According to the present disclosure, a scene generator or transition assembly is disclosed. The scene generator is configured to transition between different appearances, e.g., scenes or modes, to create two or more effects from a single assembly. In one example, the scene generator includes a stack of layered materials, a filter layer, and a combination of lighting to create an image able to transition between different scenes, such as back and forth between a first (e.g., day or daytime) mode, and a second (e.g., night or nighttime) mode. The layered stack may include a number of (e.g., multiple) prints of ink or other coloring on a translucent material. The image may transition from one scene to the other based on a change of lighting (e.g., based on which lighting elements are turned off or on). For example, front lighting (or ambient lighting) may cause the first mode to appear. Edge or backlighting may cause the second mode to appear, such as in the absence of front lighting and/or with a back light to illuminate the rear of the scene.

The transition scene may be incorporated as part of an artistic display, e.g., décor, or to provide immersive experiences. Additionally, in some embodiments, the scene generator may be incorporated into other elements, such as furniture, e.g., as embedded or coupled to a bedframe, table, or the like.

Figure 1:
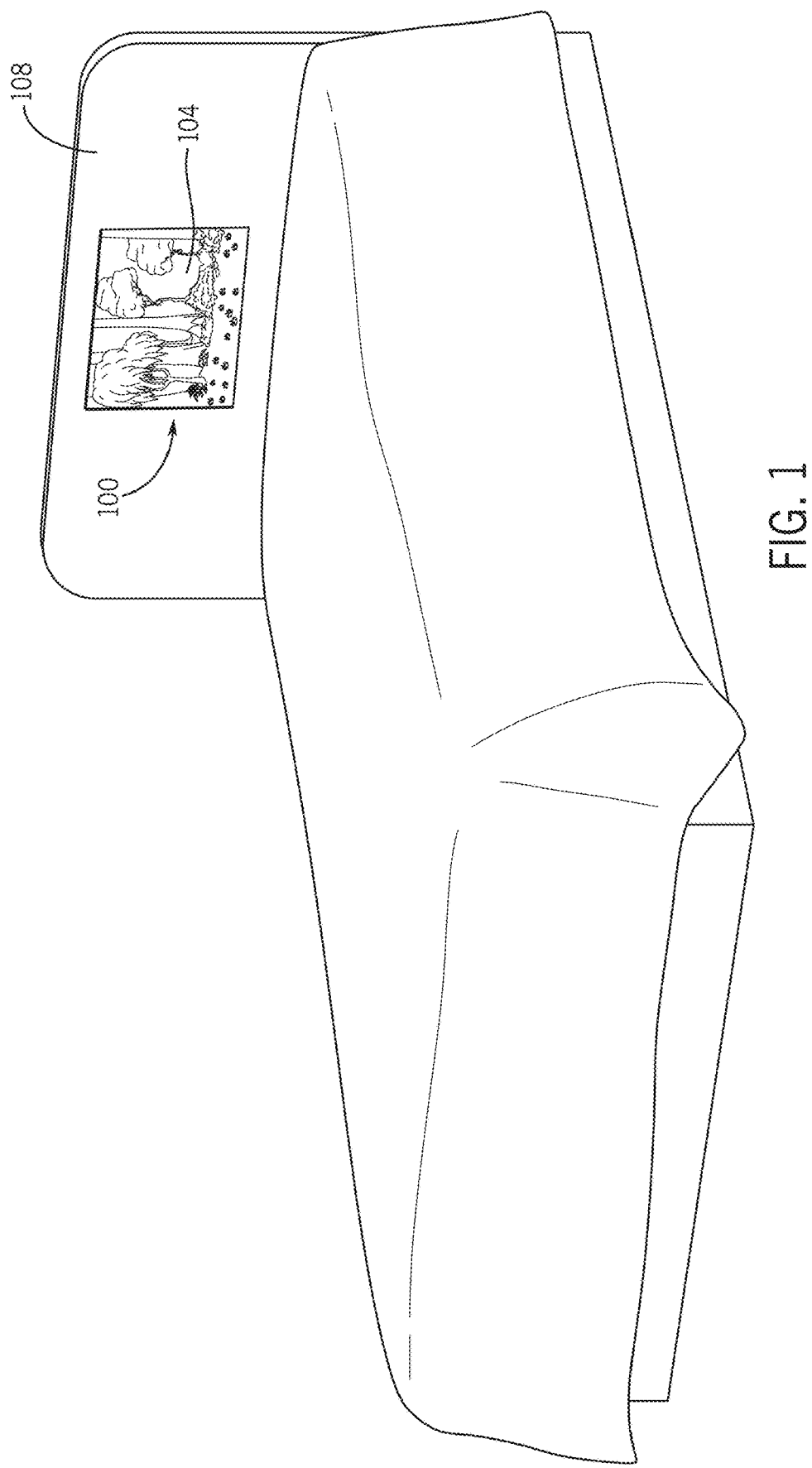
FIG. 1 illustrates an example scene generator and an example mounting of the scene generator.

FIG. 1 illustrates a scene generator 100 configured to generate or display an image 104 for viewing. For example, the scene generator 100 may display the image 104 for viewing by a viewer. To that end, the scene generator 100 may be mounted in a desired location for viewing. For instance, the scene generator 100 may be mounted to a wall, floor, ceiling, or other fixed structure. In other examples, the scene generator 100 may be integrated into or with furniture, equipment, or other movable device or system (e.g., within a ride vehicle, within a passenger vehicle, etc.). In the example embodiment of FIG. 1, the scene generator 100 may be mounted to a headboard 108, although other configurations are contemplated.

In examples, the scene generator 100 may be embodied as a standalone unit, such that the scene generator 100 may be positioned or mounted as desired (e.g., placed on a nightstand, desk, or shelf; hung on a wall; held in hand; etc.). In other examples, portions of the scene generator 100 may be distributed amongst other devices or components (e.g., a portion of the headboard 108 forming a portion of the scene generator 100).

Figure 3:
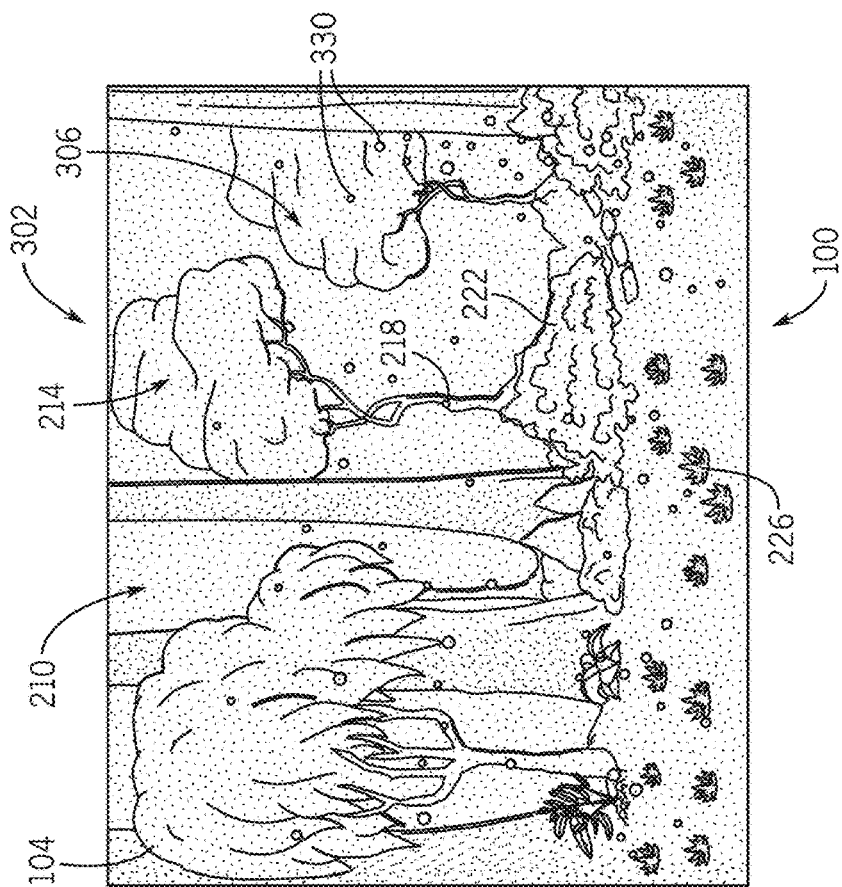
FIG. 3 illustrates an example second mode of the scene generator.
Figure 2:
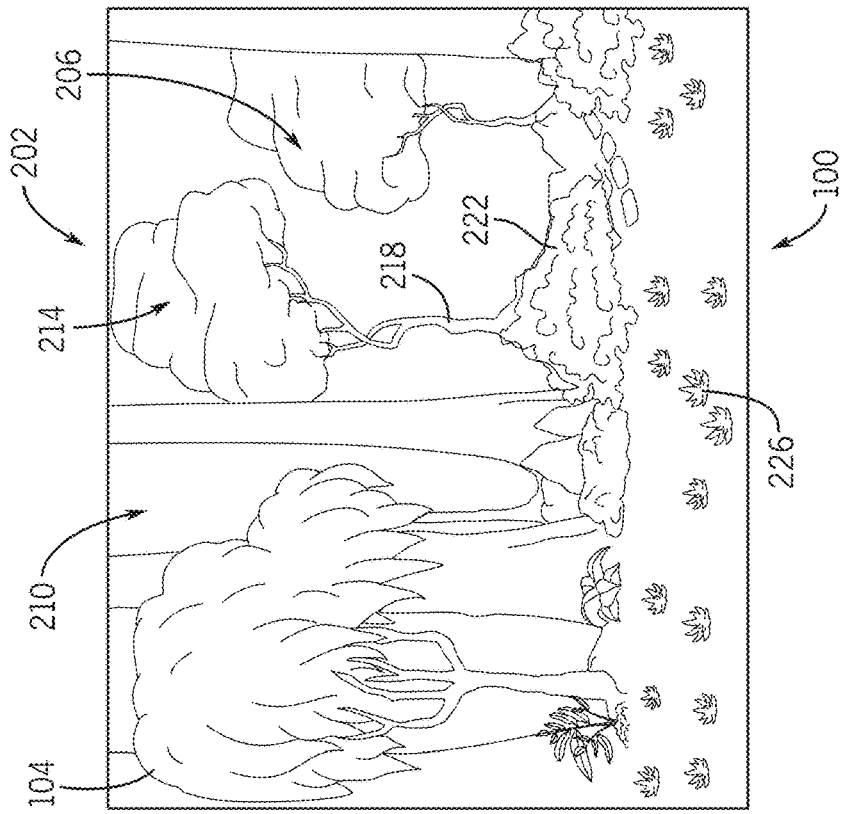
FIG. 2 illustrates an example first mode of the scene generator.

As described herein, the scene generator 100 may transition between a first mode and a second mode, e.g., the image 104 transitioning between corresponding scenes (e.g., a first scene and a second scene of the image 104). Along these lines, FIG. 2 illustrates an example first mode of the scene generator 100, and FIG. 3 illustrates an example second mode of the scene generator 100. The first mode may be a light mode (e.g., a day or daytime mode), and the second mode may be a dark mode (e.g., a night or nighttime mode), although other configurations are contemplated. For example, the first and second modes may be different light or daytime modes, or the first and second modes may be different dark or nighttime modes.

Referring to FIG. 2, in the first mode, a first scene 202 of the image 104 may be displayed. The first scene 202 may correspond to a day, daytime or daylight view of the image 104, such as a viewpoint of the scene (e.g., a nature scene) during daylight hours. The first scene 202 may include one or more first image elements 206, such as a background 210 and a foreground 214. In the nature scene shown in FIG. 2, the first scene 202 may include one or more trees 218, shrubbery 222, flowers 226, and other vegetation. In examples, the first scene 202 may include non-vegetation elements. Different images or scenes may include different image elements.

The first image elements 206 may have a first visual appearance in the first mode, such as corresponding to how the image 104 is perceived under a first type of light (e.g., during daylight hours), a first artistic viewpoint or rendering of the image/scene, etc. For example, the first image elements 206 may appear in a first manner associated with daylight hours (e.g., under sunlight). For example, the first mode may be generated by a first type of light, such as, for example, environmental or external light or positioned to illuminate a first side of the scene generator 100.

Referring to FIG. 3, in the second mode, a second scene 302 of the image 104 may be displayed. The second scene 302 may correspond to a night, nighttime, after dark, or after nightfall view of the image 104, such as a viewpoint of the same scene at night, under moonlight, or during dark hours. The second scene 302 may include one or more second image elements 306. The second image elements 306 may be the same as or different from the first image elements 206. For example, the second image elements 306 may include the background 210, foreground 214, trees 218, shrubbery 222, flowers 226, and other image elements of the first scene 202. In the example illustrated in FIG. 4, the second image elements 306 includes at least one element different than the first image elements 206, such as fireflies 330 or other glowing insect. In some examples, the fireflies 330 may be emphasized via one or more lights for effect (e.g., to selectively illuminate portions of the scene).

The second image elements 306 may have a second visual appearance in the second mode, the second visual appearance being different than the first visual appearance. The second visual appearance may correspond to how the image 104 is perceived under a second type of light (e.g., during nighttime hours), a second artistic viewpoint or rendering of the image/scene, etc. The second image elements 306 may appear in a second manner associated with nighttime hours (e.g., under moonlight, under low light, etc.), the second manner of the second scene 302 being different than the first manner of the first scene 202. The second mode may be generated by a second type of light, such as, for example, internal light or positioned to illuminate a second side of the scene generator 100.

In examples, at least one image element (e.g., each image element) may appear different in the second scene 302 compared to the first scene 202. For instance, the image elements may have a different color, hue, or shading, among other visual characteristics, in the second scene 302 compared to the first scene 202. Example image element differences in the second scene 302 may include at least some of the flowers 226 being brighter (e.g., "popping"), the trees 218 having different highlighting, the shrubbery 222 appearing more subdued, the fireflies 330 appearing or lighting, etc. In examples, light emitting diodes (LEDs) or fiber optic points may be associated with the fireflies 330, such as an individual LED or fiber optic point for each firefly 330 (e.g., to create a blinking firefly, a twinkle on and off, or other effect). In examples, the LED or fiber optic point (or other lighting elements) may be used in any of the layers, such as either behind the backlight or in the same plane as the backlight. Such examples may add an additional layer of activation, such that elements of the night scene are brighter or have a level of activation (e.g., twinkle, blink, etc.).

Figure 4:
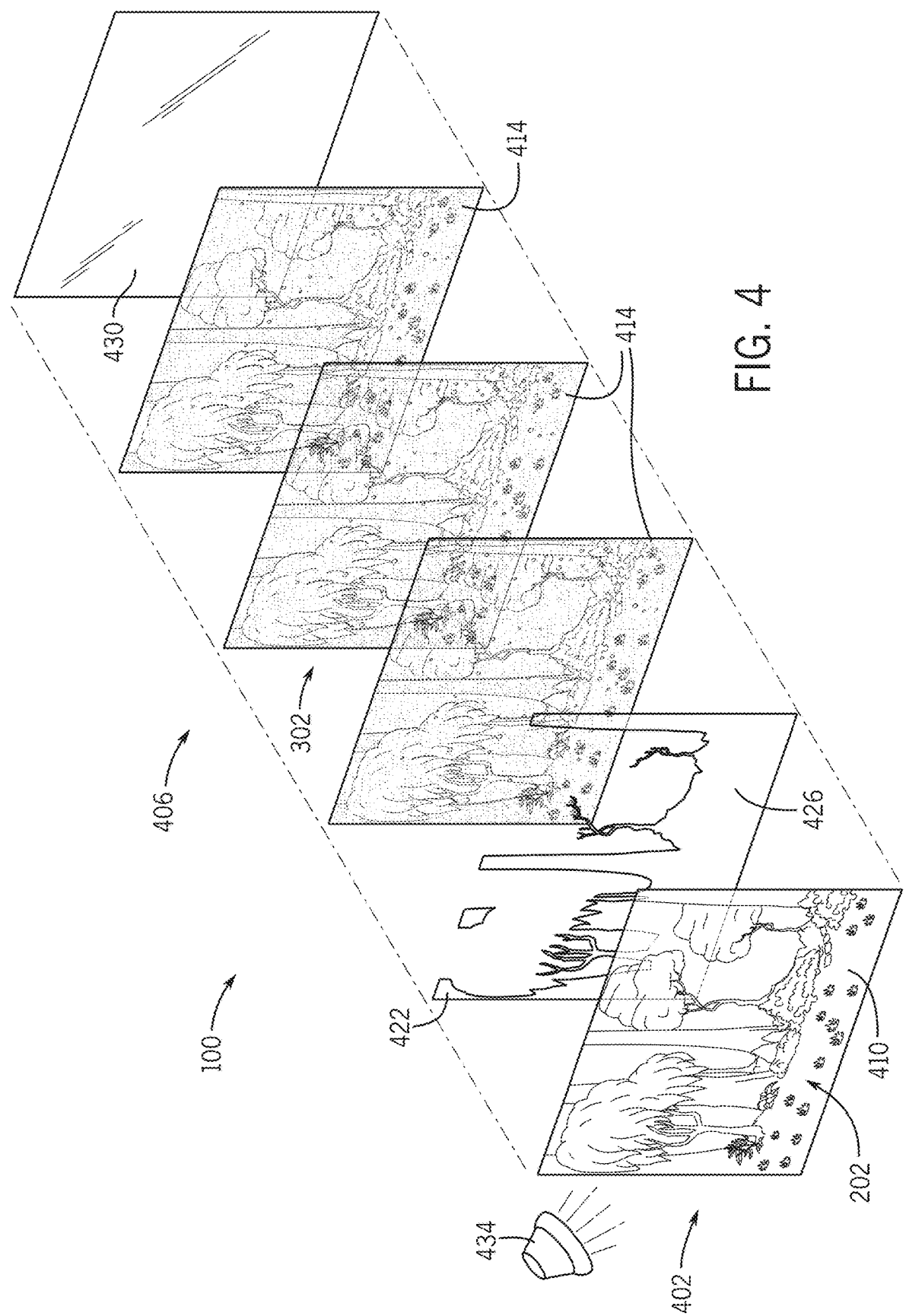
FIG. 4 illustrates an exploded view of the scene generator.

FIG. 4 illustrates an exploded view of the scene generator 100. The scene generator 100 may include a first stack or portion (e.g., a first mode stack 402) and second stack or portion (e.g., a second mode stack 406). The first mode stack 402 may include at least one film layer or print of a first scene (e.g., the first scene 202), such as a first number of film layers (e.g., a single print 410). The single print 410 may be a vellum, acetate film (e.g., clear acetate film), or other translucent or transparent film printed with the first scene 202. The single print 410 may include a level of opaqueness, such as to reflect light (e.g., to hide the second mode stack 406 and other elements positioned behind the first mode stack 402). In examples using vellum, the film layer may be translucent but not transparent. In examples using acetate, the film layer may be transparent. In such examples, translucent layers may be printed. For instance, printing the single print 410 may include a two-step process, such as a base coat of about 15% density white (e.g., that is unpatterned), followed by a color print (e.g., patterned 3-color print) on top of the base coat.

The second mode stack 406 may include at least one film layer or print of a second scene (e.g., the second scene 302), such as a second number of film layers (e.g., a plurality of prints 414, such as three prints 414). The second number may be greater than the first number, such that the second mode stack 406 includes a greater number of film layers compared to the first mode stack 402. Each print of the plurality of prints 414 may be a vellum, acetate film (e.g., clear acetate film), or other translucent or transparent material printed with the second scene 302 (e.g., a film printed with a blue night scene). In examples, the first mode stack 402 may be a front layer/stack, and the second mode stack 406 may be a rear layer/stack. In examples using vellum, the film layer may be translucent but not transparent. In examples using acetate, the film layer may be transparent. In such examples, translucent layers may be printed. For instance, printing each print 414 may include a two-step process, such as a base coat of about 15% density white (e.g., that is un-patterned), followed by a color print (e.g., patterned 3-color print) on top of the base coat.

In examples, the second mode stack 406 may include a greater number of layers/prints compared to the first mode stack 402 (e.g., three prints 414 in the second mode stack 406 compared to one print 410 in the first mode stack 402). The second mode stack 406 may require a more layers/prints to overcome the color(s) of the first mode stack 402 (e.g., to overcome the yellow film and/or strong daytime color(s)), to provide a desired saturation and color, etc., such that the second scene 302 appears realistic or true to color. The additional layers may also provide increased refinement. In other examples, the second mode stack 406 may include thicker films compared to the first mode stack 402 to provide the desired saturation, color, etc.

With continued reference to FIG. 4, the scene generator 100 may include an optional filter layer 422 between the first mode stack 402 and the second mode stack 406. The filter layer 422 may provide a mask 426 or cutout that masks or covers certain portions of the image 104, such as to darken such portions or provide other artistic effect or intent. For example, the filter layer 422 may mask select portions of the image 104, such as the background 210 or other desired portions of the image 104. The filter layer 422 may darken the amount of light that comes through and may or may not change the color of the scene. In examples, the filter layer 422 may be a neutral density (ND) filter or layer to reduce the amount of light passing through the scene generator 100. For instance, the ND filter may block between about 20% to about 80% of light (e.g., about 60% of light). In examples, the filter layer 422 may add depth to the image 104, such as to provide a three-dimensional effect.

The scene generator 100 may include a backlight 430 (e.g., at the rear of the scene generator 100). The backlight 430 may include a light panel or other controllable lighting elements to provide backlighting for the scene generator 100. In examples, the backlight 430 may be edge lit, although other configurations are contemplated. The backlight 430 may include one or more LEDs (e.g., an LED panel) or other lighting elements configured to generate visible light (e.g., white light). Other sources may include ultraviolet (UV) light (e.g., black light). Although not illustrated, the scene generator 100 may include a protection layer (e.g., at the front of the scene generator 100). The protection layer may be a layer of glass, acrylic, etc. for protecting the stack. In examples, the scene generator 100 may be encased in frame (not shown).

The various layers of the scene generator 100 may be stacked directly on top of each other (e.g., with no space). For example, starting at the rear of the device, the second mode stack 406 may be stacked on top of the backlight 430, the filter layer 422 may be stacked on top of the second mode stack 406, and the first mode stack 402 may be stacked on top of the filter layer 422. When stacked, the image elements, pattern or scene of each layer may align (e.g., each film layer of the first mode stack 402 and the second mode stack 406 may include image elements that align when stacked on top of one another). For example, the first image elements 206 may align with the second image elements 306. In this manner, each layer of the second mode stack 406 may align, and the layers of the second mode stack 406 may align with the first mode stack 402 and the optional filter layer 422. In this manner, the various layers may include the same or similar pattern, such as the same image printed with different color and/or other visual characteristics.

The scene generator 100 may transition between the first mode and the second mode to selectively display either the first scene 202 or the second scene 302. The transition may be controlled by one or more lighting effects. For example, a front light 434 may direct light onto the front surface of the scene generator 100 (e.g., onto the first mode stack 402). The first scene 202 may be visible based on light directed onto the first mode stack 402 (e.g., by the front light 434). For example, an opaqueness of the single print 410 may reflect the directed light, such that the first scene 202 is visible. The front light 434 may be a spotlight positioned to rake the front surface, or the front light 434 may be provided by ambient light (e.g., sunlight, other light sources in the room, etc.). The first scene 202 may be visible when the front light 434 is directed or projected onto the front surface, when there is sufficient ambient light, etc. Like the backlight 430, the front light 434 may generate visible and/or nonvisible light. For example, the front light 434 may include one or more LEDs configured to generate white light, UV light, etc. In examples, the front light 434 and backlight 430 may generate the same or different light, such as a mixture of UV and white light. For example, the front lighting of the scene may be done with UV light, and the backlight reveal may be black light, or any other combination. In such examples, the scene generator 100 may include UV reactive inks or paints.

The scene generator 100 may transition (e.g., fade) to the second mode based on activation of the backlight 430. For instance, activating the backlight 430 may illuminate the second mode stack 406. In some examples, transitioning to the second mode may require both activation of the backlight 430 and a reduction of the front light 434. Illuminating the second mode stack 406 with the backlight 430 may cause the second scene 302 to be visible. Rather than overpowering an image of the first mode stack 402, illuminating the second mode stack 406 may shift or augment the visible image 104 from the first scene 202 to the second scene 302. For example, because the first mode stack 402 and the second mode stack 406 include the same image (but with different colors or other visual elements), simply adjusting the lighting characteristics may transition between the first scene 202 and the second scene 302, instead of switching between two different images.

In examples, the first scene 202 may be visible in the absence of backlighting. For instance, whenever the backlight 430 is off, the first scene 202 may be visible. Along these lines, the scene generator 100 may default to display the first scene 202, such as constantly or automatically when the backlight 430 is off (e.g., in the absence of power, when turned off, etc.). In this manner, the scene generator 100 may display a first scene (e.g., the first scene 202) until the backlight 430 is activated, whereupon the scene generator 100 will transition to a second scene (e.g., the second scene 302). The scene generator 100 may transition between modes automatically (e.g., based on time of day, as controlled by an automation or computing system) or manually (e.g., based on a switch activation controlling the backlight 430 and/or front light 434).

Figure 5:
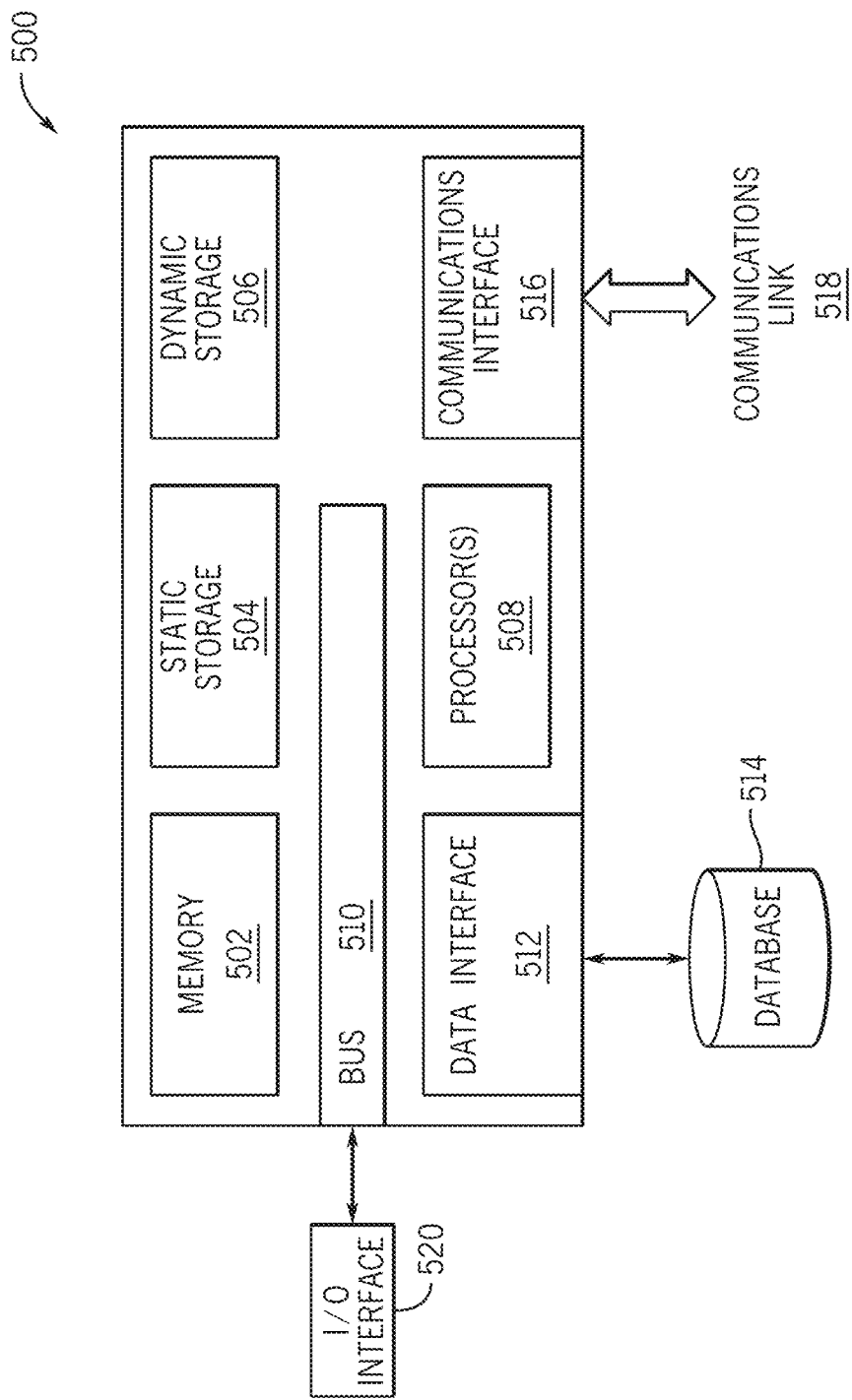
FIG. 5 illustrates an example computing system for implementing various examples described herein.

FIG. 5 illustrates an example computing system 500 for implementing various examples described herein. For example, in various embodiments, components of the scene generator 100 or other systems described herein may be implemented by one or several computing systems 500. This disclosure contemplates any suitable number of computing systems 500. For example, the computing system 500 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 500 may include one or more computing systems; be unitary or distributed; span multiple locations; span multiple machines; span multiple data centers; or reside in a cloud, which may include one or more cloud components in one or more networks.

Computing system 500 includes a bus 510 (e.g., an address bus and a data bus) or other communication mechanism for communicating information, which interconnects subsystems and devices, such as processor 508, memory 502 (e.g., RAM), static storage 504 (e.g., ROM), dynamic storage 506 (e.g., magnetic or optical), communications interface 516 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 520 (e.g., keyboard, keypad, mouse, microphone, display). In particular embodiments, the computing system 500 may include one or more of any such components.

In particular embodiments, processor 508 includes hardware for executing instructions, such as those making up a computer program. For example, a processor 508 may execute instructions for various components of the scene generator 100 or other systems described herein. The processor 508 circuitry includes circuitry for performing various processing functions, such as executing specific software to perform specific tasks (e.g., turning on/off backlight 430 or front light 434). In particular embodiments, I/O interface 520 includes hardware, software, or both, providing one or more interfaces for communication between computing system 500 and one or more I/O devices. Computing system 500 may include one or more of these I/O devices, where appropriate. One or more of these I/O devices may enable communication between a person and computing system 500.

In particular embodiments, the communications interface 516 includes hardware, software, or both providing one or more interfaces for communication (such as, for example, packet-based communication) between computing system 500 and one or more other computer systems or one or more networks. One or more memory buses (which may each include an address bus and a data bus) may couple processor 508 to memory 502. Bus 510 may include one or more memory buses, as described below. In particular embodiments, one or more memory management units (MMUs) reside between processor 508 and memory 502 and facilitate accesses to memory 502 requested by processor 508. In particular embodiments, bus 510 includes hardware, software, or both coupling components of computing system 500 to each other.

According to particular embodiments, computing system 500 performs specific operations by processor 508 executing one or more sequences of one or more instructions contained in memory 502. For example, instructions for the scene generator 100 or other systems described herein may be contained in memory 502 and may be executed by the processor 508. Such instructions may be read into memory 502 from another computer readable/usable medium, such as static storage 504 or dynamic storage 506. In alternative embodiments, hard-wired circuitry may be used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 508 for execution. Such a medium may take many forms, including but not limited to, nonvolatile media and volatile media. Non-volatile media includes, for example, optical or magnetic disks, such as static storage 504 or dynamic storage 506. Volatile media includes dynamic memory, such as memory 502.

Computing system 500 may transmit and receive messages, data, and instructions, including program, e.g., application code, through communications link 518 and communications interface 516. Received program code may be executed by processor 508 as it is received, and/or stored in static storage 504 or dynamic storage 506, or other storage for later execution. A database 514 may be used to store data accessible by the computing system 500 by way of data interface 512. In various examples, communications link 518 may communicate with the scene generator 100 or other systems described herein.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A system configured to selectively display a first scene or a second scene of an image, the system comprising:
    a first portion providing the first scene of the image;
    a second portion providing the second scene of the image; and
    a backlight configured to selectively illuminate the second portion, the second portion positioned between the backlight and the first portion,
    wherein the system is configured to transition from the first scene of the image to the second scene of the image based on selective illumination of the second portion by the backlight.

2. The system of claim 1, further comprising a front light positioned to rake a front surface of the first portion with light, wherein the first scene is visible based on the light directed onto the first portion.

3. The system of claim 1, further comprising a filter layer positioned between the first portion and the second portion, wherein the first portion, the second portion, and the filter layer are stacked on top of one another in alignment.

4. The system of claim 3, wherein the filter layer comprises a mask that covers a first portion of the image.

5. The system of claim 4, wherein the portion of the image comprises a foreground of the image.

6. The system of claim 1, wherein the second portion comprises a plurality of film layers each printed with the second scene and stacked on top of one another.

7. The system of claim 6, wherein the first portion comprises a single film layer printed with the first scene.

8. The system of claim 1, wherein the first portion comprises a first mode stack comprising at least one print of the first scene of the image, and wherein the second portion comprises a second mode stack comprising at least one print of the second scene of the image.

9. The system of claim 1, wherein the backlight is edge lit.

10. A system switchable between a first mode displaying a first scene of an image, and a second mode displaying a second scene of the image, the system comprising:
    a first mode stack providing the first scene;
    a second mode stack providing the second scene; and
    a backlight configured to selectively illuminate the second mode stack, the second mode stack positioned between the backlight and the first mode stack,
    wherein the first scene is visible based on light directed onto the first mode stack, and
    wherein the second scene is visible based on selective illumination of the second mode stack.

11. The system of claim 10, further comprising a filter layer positioned between the first mode stack and the second mode stack, the filter layer comprising a neutral density filter.

12. The system of claim 10, wherein:
    the first mode stack comprises a first number of film layers;
    the second mode stack comprises a second number of film layers; and
    the second number is greater than the first number.

13. The system of claim 12, wherein each film layer of the first mode stack and the second mode stack comprises one or more image elements that align when stacked on top of one another.

14. The system of claim 12, wherein the first scene is printed on each film layer of the first mode stack and the second scene is printed on each film layer of the second mode stack.

15. A system configured to display a visible image, the system comprising:
    a first mode providing a first scene for the image;
    a second mode providing a second scene for the image; and
    a backlight,
    wherein the system is configured to transition between the first mode providing the first scene and the second mode providing the second scene based on selective illumination by the backlight.

16. The system of claim 15, wherein:
    the second mode comprises a second mode stack providing the second scene;
    the backlight is configured to selectively illuminate the second mode stack; and
    selective illumination of the second mode stack shifts the image from the first scene to the second scene.

17. The system of claim 16, wherein the first mode comprises a first mode stack providing the first scene.

18. The system of claim 17, wherein each of the first mode stack and the second mode stack comprises one or more film layers, and wherein the second mode stack comprises a greater number of film layers compared to the first mode stack.

19. The system of claim 17, further comprising a neutral density (ND) filter positioned between the second mode stack and the first mode stack, the ND filter defining a mask cut to cover select portions of the image.

20. The system of claim 15, further comprising a front light configured to direct light onto a front surface of the first mode.

* * * * *